United States Patent

Watanabe et al.

[11] Patent Number: 6,017,588
[45] Date of Patent: Jan. 25, 2000

[54] METHOD FOR REINFORCING STRUCTURES

[75] Inventors: Takeshi Watanabe; Hiroaki Katano; Tsuneo Tanaka, all of Yokohama; Joji Shibata, Isesaki; Mitsuhiro Yada, Isesaki; Takeshi Nemoto, Isesaki, all of Japan

[73] Assignee: Mitsubishi Chemical Corporation, Tokyo, Japan

[21] Appl. No.: 09/030,755

[22] Filed: Feb. 25, 1998

[30] Foreign Application Priority Data

Feb. 28, 1997 [JP] Japan ................................ 9-062025
Jun. 9, 1997 [JP] Japan ................................ 9-166506

[51] Int. Cl.[7] .......................... B29C 63/00; B32B 27/08; B32B 27/12; B05D 7/24
[52] U.S. Cl. ...................... 427/407.1; 156/71; 156/80; 156/94; 264/257; 427/140; 427/386; 427/393.6
[58] Field of Search .......................... 427/407.1, 386, 427/387, 140, 136, 403, 393.6; 156/71, 80, 94; 264/257, 271.1

[56] References Cited

U.S. PATENT DOCUMENTS

| | | | |
|---|---|---|---|
| 4,758,299 | 7/1988 | Burke | 156/313 |
| 4,933,392 | 6/1990 | Andrews et al. | 525/110 |
| 5,106,440 | 4/1992 | Tangeman | 264/314 |
| 5,229,438 | 7/1993 | Ishida et al. | 523/428 |
| 5,482,737 | 1/1996 | Gaveske | 427/140 |
| 5,542,229 | 8/1996 | Saito et al. | 52/721.5 |
| 5,554,672 | 9/1996 | Saito et al. | 523/466 |
| 5,576,062 | 11/1996 | Gaveske | 427/230 |
| 5,635,263 | 6/1997 | Saito | 428/40.1 |
| 5,736,197 | 4/1998 | Gaveske | 427/297 |
| 5,855,961 | 1/1999 | Hoenel et al. | 427/372.2 |

FOREIGN PATENT DOCUMENTS

| | | |
|---|---|---|
| 6-172498 | 6/1994 | Japan . |
| 7-34677 | 2/1995 | Japan . |
| 2657418 | 6/1997 | Japan . |

*Primary Examiner*—Diana Dudash
*Attorney, Agent, or Firm*—Dike, Bronstein, Roberts & Cushman, LLP; David G. Conlin

[57] ABSTRACT

The present invention relates to a method for reinforcing a structure comprising the steps of forming a primer layer on the surface of a structure to be reinforced; forming if necessary a putty layer on the primer layer; applying an impregnating resin on the formed primer layer provided that the putty layer in case where the putty layer is formed on the primer layer, before, after or before and after cladding with the fiber sheets, to allow the resin to penetrate into the spaces in the fiber sheets; and curing the resin, the said primer, putty and impregnating resin comprising a resin composition which can cure at a temperature not more than 5° C.

31 Claims, No Drawings

METHOD FOR REINFORCING STRUCTURES

BACKGROUND OF THE INVENTION

The present invention relates to a method for reinforcing structures, more particularly, to a concrete-structure reinforcing method in which the surface of a concrete structure to be reinforced is tightly clad with a fiber sheet or sheets with a resin.

Concrete has been widely used as the principal component of concrete structures such as piers, highway props, architecture, etc. Since concrete has strong alkalinity, the corrosion of the reinforcing iron bars contained in the concrete can be prevented. But in long time use, the concrete loses its alkalinity, initially from the surface portion, and is finally neutralized by the action of carbon dioxide in the air. When concrete neutralization reaches the reinforcing iron bars, they now become susceptible to corrosion and are increased in volume, resulting in causing cracks of the concrete structure to accelerate its deterioration.

The concrete structures are also subject to cracking, collapse, partial loss and other similar troubles by loading a force over the design limitations in the event of an earthquake, land subsidence, overloading or other circumstances. There are also the cases where the strength of the concrete structure is lowered by some reason or other or where the structural strength is insufficient at the stage of design.

In order to overcome these problems, to recover the strength, or to make up for the lack of strength, there have been proposed the concrete structure reinforcing methods in which the concrete surface is clad with a carbon fiber prepreg comprising mainly high-strength carbon fibers and an impregnating agent. For instance, Japanese Patent Application Laid-Open (KOKAI) No. 7-34677 proposes a structure reinforcing method in which as a primer, a cold-setting resin such as epoxy resin, urea resin, resorcinol resin or phenol resin is applied on the surface of a structure to be reinforced, and a carbon fiber prepreg comprising basically carbon fibers having a basis weight of not less than 200 g/m$^2$ and a resin content of not more than 15% is clad onto the cold-setting resin, this prepreg is further coated with a cold-setting resin such as epoxy resin, and the cold-setting resin is then cured.

In the above reinforcing method, it is essential for elevating the reinforcing effect that the said fiber sheet has a high tensile strength, and that the said sheet is attached fast to the structure surface.

However, in making reinforcement of a structure by using a resin such as mentioned above, the adherent force of the reinforcing carbon fiber sheet layer to the structure surface tends to become into relatively low due to slow curing or incomplete curing of the resin under the low-temperature and water-wet conditions in the winter season. Consequently, the reinforcing fiber sheet layer provided by the reinforcing work may be easily peeled off by an external force, making it unable to produce the desired reinforcing effect.

As a result of the present inventors' earnest studies to solve the above problems, it has been found that when a structure is reinforced by forming a primer layer on its surface by using a specific primer, if necessary, further forming a putty layer on the primer layer, and applying a specific impregnating resin on the surface of the thus formed primer layer (or the putty layer, in case where the putty layer is formed on the primer layer) before and/or after cladding with the fiber sheets, allowing the impregnating resin to penetrate into the spaces in the fiber sheets and curing the impregnating resin, the handling of the impregnating resin applied is greatly facilitated and it becomes possible to increase the strength of the fiber sheets and to attach them fast to the structure surface with a resin, even under the low-temperature and water-wetted conditions in the winter season. The present invention has been attained on the basis of the above finding.

SUMMARY OF THE INVENTION

An object of the present invention is to provide a method for reinforcing structures in which a primer layer is formed on the surface of a structural to be reinforced, with a putty layer formed, if necessary on the primer layer, and an impregnating resin is coated on the thus formed primer layer (or the putty layer, in case where the putty layer is formed on the primer layer) before and/or after cladding with the fiber sheets, allowing the impregnating resin to penetrate into the spaces in the fiber sheets and cure, whereby the handling of the impregnating resin applied is notably improved and it becomes possible to elevate the strength of the fiber sheets and to attach them fast to the surface of the structure to be reinforced.

To accomplish the aim, in a first aspect of the present invention, there is provided a structure reinforcing method comprising the steps of forming a primer layer on the surface of a structure to be reinforced; forming, if necessary, a putty layer on the primer layer; applying an impregnating resin on the formed primer layer provided that the putty layer in case where the putty layer is formed on the primer layer, before and/or after cladding with the fiber sheets, to allow the impregnating resin to penetrate into the spaces in the fiber sheets; and curing the impregnating resin, the said primer, putty and impregnating resin comprising a resin composition which can cure at a temperature not more than 5° C.

In a second aspect of the present invention, there is provided a structure reinforcing method comprising the steps of forming a primer layer on the surface of a structure to be reinforced; forming, if necessary, a putty layer on the primer layer; applying an impregnating resin on the surface of the formed primer layer provided that putty layer in case where the putty layer is formed, before and/or after cladding with the fiber sheets, to allow the impregnating resin to penetrate into the spaces in the fiber sheets; and curing the impregnating resin, the primer, putty and/or impregnating resin comprising a mixture which can be cured at a temperature of not more than 5° C., of (1) a resin composition containing epoxy resin(s) and divalent alcoholic glycidyl ether, and (2) a curing agent composition containing a Mannich type curing agent.

In a third aspect of the present invention, there is provided a structure reinforcing method comprising the steps of forming a primer layer on the surface of a structure to be reinforced; forming, if necessary, a putty layer on the primer layer; applying an impregnating resin on the surface of the formed primer layer provided that putty layer in case where the putty layer is formed, before and/or after cladding with the fiber sheets, to allow the impregnating resin to penetrate into the spaces in the fiber sheets; and curing the impregnating resin, the primer, putty and/or impregnating resin comprising a resin composition which can be cured at a temperature of not more than 5° C. and contains vinyl ester resin.

DETAILED DESCRIPTION OF THE INVENTION

The present invention is explained more detail as follows.

The reinforcing method of the present invention comprises essentially the steps of forming a primer layer on the surface of a structure to be reinforced; forming, if necessary, a putty layer on the primer layer surface; cladding its surface with fiber sheets, applying thereto an impregnating resin so as to impregnate into the fiber sheets with the said resin, before and/or after said cladding step; and curing the impregnating resin, the curing of the primer, putty and impregnating resin being conducted at a temperature of not higher than 5° C. Therefore, it is essential in the present invention to use a resin composition as the primer, putty and impregnating resin, which can be cured at a temperature not more than 5° C.

The resin composition which can be cured at the temperature of not more than 5° C. is not restricted specifically, but the following a mixture (A) comprising components (1) and (2) or a resin composition (B) is preferably used as the resin composition.

The mixture (A) comprising a resin composition (1) comprising an epoxy resin and a divalent alcoholic diglycidyl ether, and a curing agent composition (2) comprising Mannich type curing agent, in which the said component (1) can be cured at the temperature of not more than 5° C.

The resin composition (B) containing a vinyl ester resin which can be cured at the temperature not more than 5° C.

Incidentally, "primer layer" and "putty layer" in the present invention mean a primer layer and putty layer as usually defined in this art. The primer layer means an adhesive layer provided between a structure and a fiber sheet. The putty layer means a layer formed so as to make an unevenness surface flat.

The reinforcing method of the present invention can be applied to a variety of structures, which include, for example, concrete piers, concrete props for overhead structures such as elevated railroad or expressway, pillars and walls of concrete buildings, structures having a concrete surface such as base plates for roads, and structures which can be reinforced by surface cladding with fiber sheets, such as metallic or wooden struts.

In carrying out the method of the present invention, if necessary the structure to be reinforced is cleared of extraneous matter such as laitance on the surface or subjected to pretreatments such as repair in case where there is unevenness, disfigurement, local collapse, chipping or such on the surface before forming a primer layer. For such repair, there is usually used resin mortar made by mixing sand, gravel or crushed stone with resin, resin concrete, resin cement, or a material of the same type as used for the structure.

Preferred examples of the primer, putty and impregnating resin used in the second aspect of the present invention are explained as follows.

The primer, putty and impregnating resin used in the present invention comprise the mixture (A) of the resin composition (1) comprising an epoxy resin, a divalent alcoholic diglycidyl ether, and optionally an acrylic oligomer and a thixotropic agent; and the curing agent composition (2) comprising a Mannich curing agent and optionally an aliphatic polyetherdiamine, the said mixture and curing agent composition being cured at the temperature not more than 5° C., preferably not more than 0° C.

The above-mentioned epoxy resin is preferably the one having a viscosity not more than 150 PS (poise), preferably not more than 100 PS, more preferably 40 to 15 PS, as measured at 25° C. Especially, as such epoxy resins, bisphenol F epoxy resins and/or bisphenol A epoxy resins are preferably used.

The said bisphenol F epoxy resins are usually produced by reacting epichlorohydrin with the hydroxyl groups of bisphenol F. Bisphenol F epoxy resins are bifunctional resins. Generally, in preparation of bisphenol F epoxy resins, there are produced not only the resins of a low molecular weight corresponding to the degree of polymerization of n=0 of phenolic novolak epoxy resins, but also collaterally produced are the resins with various higher molecular weights depending on the molar ratio of the bisphenol F to epichlorohydrin.

The said bisphenol A epoxy resins can be produced by reacting epichlorohydrin with the hydroxyl groups of bisphenol A. Bisphenol A epoxy resins are bifunctional resins like bisphenol F epoxy resins. Bisphenol A epoxy resins are provided as a mixture of the resins with various molecular weights depending on the molar ratio of the bisphenol A to epichlorohydrin.

The said divalent alcoholic diglycidyl ether is a reactive diluent which serves for lowering the viscosity of the prepared resin composition and is cured on reaction with the curing agent amine to constitute a component of the resin layer formed. Examples of such divalent alcoholic diglycidyl ether are 1,6-hexanediol diglycidyl ether, 1,4-butanediol diglycidyl ether, or the like. Of these, 1,6-hexanediol diglycidyl ether is preferred.

The said acrylic oligomer, like the said divalent alcoholic diglycidyl ether, is a reactive diluent which serves for lowering the viscosity of the prepared resin composition and is cured on reaction with the curing agent amine to constitute a component of the resin layer formed. The acrylic compounds constituting the said acrylic oligomer include, for example, acrylic acid, methacrylic acid, acrylic alkyl esters and methacrylic-alkyl esters.

The said thixotropic agent is added for preventing sags of the impregnating resin obtained by mixing the said resin composition and the said curing agent composition. Various inorganic fine particles are usable as the thixotropic agent in the present invention, but for instance finely powdered silica is preferably used.

The said resin composition (1) comprises preferably 60 to 85 wt % of the said epoxy resin, 15 to 40 wt % of the said divalent alcoholic diglycidyl ether, 0 to 15 wt % of the said acrylic oligomer and 0 to 5 wt % of the said thixotropic agent.

The said Mannich curing agent is a curing agent obtained by using a Mannich basic compound as base amine. The "Mannich basic compound" means a compound having a structure in which the active methylene carbons have been aminomethylated. Such Mannich curing agents include, for example, the curing agents obtained by using metaxylenediamine, isophoronediamine or the like as base amine, of which the curing agent prepared by using metaxylenediamine as base amine is preferred.

The said aliphatic polyetherdiamines may include polyoxypropylenediamine, polyoxypropylenetriamine and the like.

The said curing agent composition (2) comprises preferably 60 to 100 wt % of the said Mannich curing agent and 0 to 40 wt % of the said aliphatic polyetherdiamine.

In preparing a primer, a putty and an impregnating resin by mixing the said resin composition (1) and the said curing agent composition (2), the ratio of the number of the functional groups in the resin composition to the number of the active hydrogens in the curing agent composition is adjusted to fall usually within the range from 1:0.85 to 1:1.2, preferably from 1:0.9 to 1:1.1. Specifically, the resin composition (1) comprising 60 to 85 wt % of an epoxy resin and 15 to 40 wt % of a divalent alcoholic diglycidyl ether and the curing agent composition (2) comprising 60 to 100 wt % of a Mannich curing agent and 0 to 40 wt % of an aliphatic polyetherdiamine are mixed by such a manner that, in the mixture, the ratio of one equivalent of the theoretical functional groups in the resin composition (1) to t he equivalent of the theoretical active hydrogens in the curing agent composition (2) becomes 1:0.85 to 1:1.2. When the above ratio exceeds 1:1.2, the cured product may deteriorate in properties, and when the above ratio is lower than 1:0.85, there may take place imperfect cure and a drop of cured product properties. The "functional groups" referred to in the present invention means the groups which can be attached to the active hydrogens on reaction therewith. Typical examples of such functional groups usable in the present invent ion are epoxy groups and acrylate groups.

A preferable example of the resin composition which comprises a mixture (A) of the above resin composition (1) and the above curing composition (2) and is cured at the temperature not more than 5° C., is a mixture of the resin composition (1) comprising a bisphenol type epoxy resin of 70 to 75 wt % having a viscosity of not more than 40 PS at 25° C., 1,6-hexanediol diglycidyl ether of 25 to 30 wt % and thixotropic agent of 0 to 5 wt %, and the curing agent composition (2) comprising Mannich type curing agent of 60 to 100 wt % and aliphatic polyether diamine of 40 to 0 wt %. Another preferable example of the said resin composition which comprises a mixture of the above resin composition (1) and the above curing composition (2) and is cured at the temperature not more than 5° C., is a mixture of the resin composition (1) comprising a bisphenol type epoxy resin of 70 to 75 wt % having a viscosity of not more than 40 PS at 25° C., 1,6-hexanediol diglycidyl ether of 15 to 20 wt %, acrylic oligomer of 5 to 10 wt % and thixotropic agent of 0 to 5 wt %, and the curing agent composition (2) comprising Mannich type curing agent of 60 to 100 wt % and aliphatic polyether diamine of 40 to 0 wt %.

The resin composition (1) and the curing agent composition (2) used for preparing the primer, putty and impregnating resin in the present invention may be same or different in base for the respective preparations. In either case, from the viewpoint of utility, the viscosity of the said materials at 0° C. is adjusted to the range usually from 20 to 100 PS, preferably from 20 to 50 PS for the primer, usually from 500 to 1,000 PS, preferably from 600 to 800 PS for the putty, and usually from 50 to 150 PS, preferably from 50 to 100 PS for the impregnating resin. Such adjustment of viscosity is usually made by controlling the amounts of the reactive diluent, thixotropic agent and/or filler added.

Preferred examples of the primer, putty and impregnating resin used in the third aspect of the present invention are explained below. The resin compositions which are cured at a temperature not more than 5° C., preferably not more than 0° C., more preferably not more than −5° C., and comprises a vinyl ester resin are used for these primer, putty and impregnating resin.

The vinyl ester resin used for the above compositions may be the known one and is not specifically defined in the present invention. It is possible to use, for instance, a reaction product obtained from the reaction of an epoxy resin and an unsaturated monobasic acid, or a reaction product obtained by reacting an epoxy compound having α,β-unsaturated carboxylic acid ester groups with a carboxy-terminated polyester obtained from a saturated dicarboxylic acid and/or unsaturated carboxylic acid and a polyhydric alcohol to prepare a polyester acrylate or methacrylate and blending a reactive diluent therein.

The epoxy resins usable as starting material for the said reaction product may include glycidyl ethers of polyvalent phenols such as bisphenol A epoxy resins, bisphenol F epoxy resins, bisphenol S epoxy resins, phenolic novolak epoxy resins, cresol novolak epoxy resins, brominated bisphenol A epoxy resins, and brominated phenolic novolak epoxy resins; glycidyl esters such as diglycidyl phthalate, diglycidyl hexahydrophthalate, diglycidyl tetrahydrophthalate, and benzoic acid or dimer acid glycidyl esters; heterocyclic epoxy resins such as 1,3-diglycidyl-5,5-dimethylhydantoin and triglydicyl isocyanurate; and alicyclic epoxy resins such as naphthalene-based epoxy resins and 2,2',4,4'-tetraglycidoxybiphenyl. These epoxy resins maybe used either singly or as a mixture of two or more of them.

Examples of the unsaturated monobasic acids usable for the said reaction product include acrylic acid, methacrylic acid, crotonic acid, cinnamic acid, sorbitanic acid, acrylic dimers, monomethyl malate, monopropyl malate, monobutyl malate, mono(2-ethylhexyl)malate and the like. These unsaturated monobasic acids may be used either singly or as a mixture of two or more of them.

As the unsaturated dicarboxylic acid, there may be used unsaturated polybasic acids having active unsaturated bonds or their anhydrides, such as fumalic acid, maleic anhydride, maleic acid and itaconic acid. As the saturated dicarboxylic acid, there may be used saturated polybasic acids having no active unsaturated bonds or their anhydrides, such as phthalicanhydride, isophthalic acid, terephthalic acid, tetrahydrophthalic acid, adipic acid and sebacic acid. The polyvalent alcohols usable for the said reaction product include ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexane-1,4-dimethanol, ethylene oxide adducts of bisphenol A, and propylene oxide adducts of bisphenol A. If necessary, monocarboxylic acids such as benzoic acid, abietic acid and dicyclopentadiene malate may be used as an acid component. A typical example of the epoxy compounds having α,β-unsaturated carboxylic acid ester groups is glycidyl methacrylate.

Preferred examples of the vinyl ester resins usable in the present invention include those commercially available under the trade names of Ripoxy R-808, R-806, R-804 and R-802, which are the bisphenol A type vinyl ester resins, Ripoxy S-510 and S-550, which are the brominated bisphenol A type vinyl ester resins, Ripoxy H-600, H-630, H-610 and H-6001, which are the novolak type vinyl ester resins, and Ripoxy RT933 and RT833, which are the rubber-modified type vinyl ester resins, all available from Showa Highpolymer Co., Ltd.

Bisphenol A type vinyl ester resins are preferably used in the present invention. Such vinyl ester resins are the resins basically comprising an oligomer obtained from ring-opening addition reaction of a bisphenol A epoxy resin, which is a bisphenol A/epichlorohydrin reaction product, and an unsaturated monobasic acid such as methacrylic acid. The resins represented by the following formula are exemplified as these vinyl ester resins:

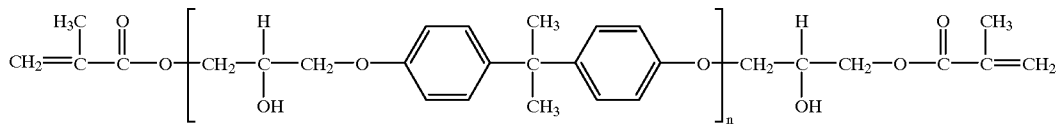

n = 1–6

The above vinyl ester resins are usually used in combination with a reactive diluent such as styrene. Also, usually a polymerization initiator and a curing accelerator are used for conducting curing, and if necessary other additives such as filler, colorant, viscosity modifier, diluent, thixotropic agent, defoaming agent, surface drying agent, etc., may be incorporated in the resin.

As the reactive diluent beside styrene, it is possible to use aromatic monomers such as α-methylstyrene, p-methylstyrene and chlorostyrene; acrylate or methacrylate monomers such as methacrylate, isobutyl acrylate or methacrylate, isobonylacrylate or methacrylate, dicyclopentenyl acrylate or methacrylate, dicyclopentenyloxyethyl acrylate or methacrylate, 2-hydroxy-3-phenoxypropyl acrylate or methacrylate, 2-hydroxyethyl acrylate or methacrylate, 2-hydroxypropyl acrylate or methacrylate and polyoxyethylene acrylate or methacrylate; and N-substituted acrylamides such as N,N-dimethylacrylamide, N,N-diethylacrylamide and N-acryloylmorpholine.

If necessary, the vinyl ester resin may be blended with various types of curable acrylic or methacrylic compounds. Examples of the curable acrylic compounds usable here include acrylates or methacrylates such as diethylene glycol diacrylate or dimethacrylate, 1,6-hexanediol diacrylate or dimethacrylate, trimethylolpropane triacrylate or trimethacrylate, pentaerythritoltriacrylate or trimethacrylate and pentaerythritol tetraacrylate or tetramethacrylate, and urethane acrylates obtained from reaction of hydroxyalkyl acrylate or methacrylate and a compound having at least 2 isocyanate groups.

As the said polymerization initiator, there may be used the specific organic peroxides, for example, ketone peroxides such as methylethyl ketone peroxide and methylisobutyl ketone peroxide; hydroperoxides such as cumene hydroperoxide and t-butyl hydroperoxide; peroxy esters such as t-butyl peroxyoctoate and t-butyl peroxybenzoate; and diacyl peroxides such as lauroylperoxide and benzoyl peroxide. Of these organic peroxides, methylethylketone peroxide in the group of ketone peroxides, cumene hydroperoxide in the group of hydroperoxides, t-butyl peroxybenzoate in the group of peroxyesters, and benzoyl peroxide in the group of diacyl peroxides, are preferably used. These polymerization initiators may be used as a mixture of two or more of them, if necessary.

As the said "curing accelerator", there can be used the materials which are capable of decomposing the polymerization initiator through redox reaction to facilitate formation of radicals. Examples of such materials are metallic soaps such as cobalt naphthenate, copper naphthenate, manganese naphthenate and cobalt octonoate, and amines such as dimethylaniline, diethylaniline and dimethylparatoluidine. These curing accelerators may be used as a mixture, if necessary. It is possible to use an auxiliary accelerator for elevating the curing efficiency. As such auxiliary accelerator, β-diketones capable of forming complexes with metallic soaps, such as acetylacetone, methyl acetoacetate, ethyl acetoacetate and dimedone, can be used.

In the said resin composition, the vinyl ester resin may be added in an amount of usually 30 to 80 wt %, preferably 40 to 65 wt %, the reactive diluent in an amount of usually 20 to 70 wt %, preferably 35 to 60 wt %, and the polymerization initiator in an amount of usually 0.1 to 8 parts by weight, preferably 0.3 to 5 parts by weight based on 100 parts by weight of the whole resin component; the curing accelerator may be added in an amount of usually 0.1 to 5 parts by weight, preferably 0.3 to 3 parts by weight based on 100 parts by weight of the whole resin component; and the auxiliary accelerator may be added in an amount of usually 0.1 to 5 parts by weight, preferably 0.3 to 3 parts by weight based on 100 parts by weight of the whole resin component.

As the polymerization initiator in the said primer, benzoyl peroxide is preferably used. As the curing accelerator in the said primer, dimethylaniline and cobalt octenoate are preferably used.

As the polymerization initiator in the said putty, benzoyl peroxide is preferably used. As the auxiliary accelerator in the said putty, dimethylaniline is preferably used.

As the polymerization initiator in the said impregnating resin, cumene hydroperoxide and t-butyl peroxybenzoate are preferably used. As the curing accelerator in the said impregnating resin, cobalt naphthenate is preferably used. As the auxiliary accelerator in the said impregnating resin, ethyl acetoacetate is preferably used.

In the present invention, the mixtures described in the second aspect of the present invention and the resin compositions described in the third aspect may be combined for use as the said primer, putty and impregnating resin. It is also possible to further incorporate other resins which can be cured at a temperature not more than 5° C. Usually, however, it is most preferable in terms of bond performance to use a substantially same resin composition for all of the primer, putty and impregnating resin.

Next, the fiber sheets used in the present invention is explained.

The said fiber sheet comprises a fibrous material impregnated with a small quantity of a resin and shaped into a sheet. As the fibrous material, carbon fiber, aramide fiber, glass fiber and the like can be used, carbon fiber being the most practical in terms of reliability. As the fiber sheet, any fibrous sheet-like product such as woven or nonwoven fabric made of a sheet-wise aligned fibrous material can be used, but a sheet-like product comprising long filament fibers aligned in one direction is especially preferred in view of manifestation of strength.

The basis weight of the fibrous material in the fiber sheet used in the present invention is usually selected to be in the range of 50 to 600 g/m$^2$, more practically 100 to 400 g/m$^2$. The amount of the resin impregnated in the fibrous material for retaining sheet-like shape is usually 0 to 15 wt %, preferably 0.5 to 8 wt %. As the impregnating resin, usually a high-temperature heat-curing resin whose curing temperature is not less than 70° C. is used. Examples of such resin include phenol resins, epoxy resins, unsaturated polyester resins, vinylester resins, diallyl phthalate resins, bismaleimide resins, polyamide resins, melamine resins, and polyurethane resins.

The said fiber sheet layer is formed by attaching a resin-impregnated fiber sheet or sheets over the surface of the primer layer (or the putty layer in case where the putty layer was formed on the primer layer) and curing the impregnating resin. A plurality of such fiber sheets may be placed one on another to form a laminate. The following methods mentioned here for the purpose of exemplification, can be employed for making the impregnating resin penetrate into the fiber sheet to make it attached securely to the surface of the primer layer and/or the putty layer:

(1) The impregnating resin is applied over the surface of the primer layer (or the putty layer in case where it is formed) and then the fiber sheet is attached to the resin-applied surface of the primer (or putty) layer;

(2) First the fiber sheet is attached to the surface of the primer layer (or the putty layer in case where it is formed) and then the impregnating resin is applied over the surface of the fiber sheet; and (3) First the impregnating resin is applied over the surface of the primer layer (or the putty layer in case where it is formed), then the fiber sheet is attached to the resin-applied surface of the primer (or putty) layer, and the impregnating resin is further applied over the surface of the fiber sheet.

Of these methods, method (3) is the most preferable.

The composition of the impregnating resin applied over the primer (or putty) layer before attachment of the fiber sheet and the composition of the impregnating resin applied over the surface of the fiber sheet after attachment may be the same or different, but in view of bond strength, it is preferable that they are the same.

The coating amount of the impregnating resin applied over the primer (or putty) layer surface and the fiber sheet surface is properly decided within the range which allows the fiber sheet and the primer (or putty) layer to bind securely into an integral cladding while considering the basis weight and porosity of the fiber sheet. The coating amount is usually in the range from 200 to 800 g/m², preferably from 300 to 600 g/m². In case where the impregnating resin is applied on both of the primer (or putty) layer surface and the fiber sheet surface, the coating amount may be adequately decreased within limits where the combined coating amount can provide a preferred integral binding of the fiber sheet and the primer (or putty) layer.

Various known methods such as mentioned above can be conducted for application of the impregnating resin. When the impregnating resin is applied, it is preferable to remove the air bubbles or voids left on the rear side of the fiber sheet by pressing the sheet from its front side with suitable means such as rollers before the resin is cured, preferably soon after application of the resin. The applied impregnating resin can be cured sufficiently even in an environment of a low temperature such as −5 to 0° C. The set-to-touch curing time, although variable depending on the various factors such as resin composition, curing agent composition, amount of the curing agent blended and ambient temperature, is usually about 8 to 18 hours. The impregnating resin of the present invention can also provide high bond strength even if the resin-applied surface is in a water-wet condition.

In this way, the fiber sheet is perfectly integrated with the primer layer (or the putty layer in case where it is formed on the primer layer) by the impregnating resin, and is attached securely to the structure surface as the resin is cured. Also, the fibers in the attached fiber sheet are strongly bonded to each other on curing of the impregnating resin to form a fiber sheet layer of high tensile strength.

In the said primer, putty and impregnating resin, there may be further added filler such as silica sand, coloring agent such as titanium oxide, light stabilizer, heat stabilizer, light screen, penetrant, silicon additives such as silane coupling agent, thinner, and solvent such as methylethyl ketone and acetone. These additives may be properly blended in the resin composition or in the curing agent composition before they are mixed.

Especially much amount of the fillers are usually used as the component of the putty. The amount of the filler used is usually 50 to 150 wt %, preferably 80 to 120 wt % based on the resin composition. As the fillers, for example, inorganic particles such as silica, silica sand, aluminum hydroxide, calcium carbonate, talc, titanium oxide are preferably used.

According to the present invention as described above, there is provided a method for reinforcing structures, especially concrete structures, comprising the steps of forming a primer layer over the surface of a structure to be reinforced, forming if necessary a putty layer on the primer layer, applying an impregnating resin on the surface of the formed primer layer (or putty layer in case the putty layer is formed on the primer layer) before and/or after cladding with a fiber sheet(s), to allow the impregnating resin to penetrate into the spaces in the fiber sheet(s), and curing the impregnating resin, wherein because of use of a specific epoxy resin composition as base of the said primer, putty and impregnating resin, the said materials are easy to handle even under a low-temperature (such as −5 to 0° C.) condition, and the fiber sheets can be attached securely to the surface of the structure to be reinforced. Thus, the present invention is of great benefit to the industry concerned.

EXAMPLES

The present invention is described in further detail with reference to the examples thereof, which examples however are merely intended to be illustrative and not to be construed as limiting the scope of the invention. In the following Examples and Comparative Examples, in order to evaluate the structure reinforcing effect simulatively, concrete slabs were used as the structures to be reinforced. The putty is normally used only at the uneven parts of the structure surface to smooth out such surface unevenness, but in the Examples of the present invention, it was applied over the whole surface of the primer layer to evaluate its bond performance. Also, for determination of the reinforcing effect, the bond strength and peel strength between the concrete slab and the fiber sheet, and the tensile strength of the resin-impregnated fiber sheet were evaluated. Further, as a measure of handling qualities of the resin used, its viscosity, set-to-touch curing time, pot life, applicability, penetrability and thixotropical properties were evaluated.

Preparation and evaluation tests of the materials used in the Examples and Comparative Examples were conducted according to the following methods.

Materials (1) Concrete Slabs

Concrete slabs having 30 cm×30 cm surface and ×5 cm thickness were used as the structures for the reinforcement test. Laitance on the surface layer of these concrete slabs was removed by a disc sander, preparing 25 test pieces. Of these 22 test pieces of concrete slab, 6 pieces were kept in a −5° C. room, 12 pieces in a 0° C. room and 2 pieces in 5° C. water, all for more than 24 hours, before put to actual use.

(2) Primer 1

(i) 73 parts by weight of a bisphenol F epoxy resin having a viscosity of 35 PS at 25° C., 27 parts by weight of 1,6-hexanediol diglycidyl ether and 0.5 part by weight of a silane coupling agent (KBM-403 produced by Shin-Etsu Chemical Industries Co., Ltd.) were mixed by a mixer and left in a 0° C. room for more than 24 hours. Separately, (ii) 56 parts by weight of a metaxylenediamine-based Mannich curing agent was left in a 0° C. room for more than 24 hours, and the (i) and (ii) were mixed well just before use. The ratio of the number of epoxy groups to the number of active hydrogens in the resultantly obtained primer 1 was 1.0.

(3) Primer 2

(i) 75 parts by weight of a bisphenol F epoxy resin having a viscosity of 35 PS at 25° C., 17 parts by weight of 1,6-hexanediol diglycidyl ether, 8 parts by weight of an acrylic oligomer and 0.5 part by weight of a silane coupling agent (KBM-403 produced by Shin-Etsu Chemical Industries Co., Ltd.) were mixed by a mixer and left in a 0° C. room for more than 24 hours. Separately, (ii) 60 parts by weight of a metaxylenediamine-based Mannich curing agent was left in a 0° C. room for more than 24 hours. The (i) and (ii) were mixed well just before use. The ratio of the number of epoxy and acrylate groups to the number of active hydrogens in the resultantly obtained primer 2 was 1.0.

(4) Primer 3

(i) 100 parts by weight of the bisphenol A epoxy resin composition containing reactive diluent of 30 wt % (the primer composition commercialized for used in winter season (XPS-301R produced by Mitsubishi Chemical Corporation) and (ii) 50 parts by weight of a curing agent comprising mainly a modified polyamine (XPS-301H produced by Mitsubishi Chemical Corporation) were left separately, each in a 0° C. room, for more than 24 hours, and they were mixed well just before use.

(5) Primer 4

100 parts by weight of a composition (Ripoxy CP-819B produced by Showa Highpolymer Co., Ltd.) comprising 47 wt % of a bisphenol A vinyl ester resin, 51.5 wt % of styrene and 1.5 wt % of cobalt octenate, 3 parts by weight of benzoyl peroxide and 1 part by weight of dimethylaniline were left separately in a -5° C. room for more than 24 hours and then mixed at the same temperature for use.

(6) Putty 1

(i) A resin composition composed of 73 parts by weight of a bisphenol F epoxy resin having a 25° C. viscosity of 35 P and 27 parts by weight of 1,6-hexanediol diglycidyl ether, and 100 parts by weight of silica sand, and (ii) 56 parts by weight of a metaxylenediamine-based Mannich curing agent and 56 parts by weight of silica sand, were mixed separately by a mixer and left in a 0° C. room for more than 24 hours. The (i) and (ii) were mixed well just before use. The ratio of the number of epoxy groups to the number of active hydrogens in the obtained putty 1 was 1.0.

(7) Putty 2

(i) 75 parts by weight of a bisphenol F epoxy resin having a 25° C. viscosity of 35 PS, 17 parts by weight of 1,6-hexanediol diglycidyl ether, 8 parts by weight of acrylic oligomer and 100 parts by weight of silica sand, and (ii) 60 parts by weight of a metaxylenediamine-based Mannich curing agent and 60 parts by weight of silica sand, were mixed separately by a mixer and left in a 0° C. room for more than 24 hours. The (i) and (ii) were mixed well just before use. The ratio of the number of epoxy groups to the number of active hydrogens in the obtained putty 2 was 1.0.

(8) Putty 3

(i) 100 parts by weight of bisphenol A epoxy resin composition containing filler of 50 wt % (putty composition for using in winter season) (L-520R produced by Mitsubishi Chemical Corporation) and (ii) 100 parts by weight of a curing agent comprising mainly modified alicyclic polyamine containing 50 wt % of filler (L-520H produced by Mitsubishi Chemical Corporation) were left separately in a 0° C. room for more than 24 hours and mixed well just before use.

(9) Putty 4

100 parts by weight of a putty resin composition comprising 50 wt % of a bisphenol A vinyl ester resin (Ripoxy R-806 produced by Showa Highpolymer Co., Ltd.), 50 wt % of $SiO_2$, 3 parts by weight of benzoyl peroxide, and 0.5 part by weight of dimethylaniline were left in a -5° C. room for more than 24 hours and mixed at the same temperature for use.

(10) Impregnating Resin 1

(i) 73 parts by weight of a bisphenol F epoxy resin having a 25° C. viscosity of 35 PS, 27 parts by weight of 1,6-hexanediol diglycidyl ether, 2 parts by weight of finely powdered silica (RY-200S produced by Nippon Aerosil Co., Ltd.) and one part by weight of color toner (ECB-401 produced by Dai-Nippon Shikizai Kogyo KK) were mixed by a mixer and left in a 0° C. room for more than 24 hours. Separately, (ii) 56 parts by weight of a metaxylenediamine-based Mannich curing agent was left in a 0° C. room for more than 24 hours. The (i) and (ii) were mixed well just before use. The ratio of the number of epoxy groups to the number of active hydrogens in the obtained impregnating resin 1 was 1.0.

(11) Impregnating Resin 2

(i) 75 parts by weight of a bisphenol F epoxy resin having a 25° C. viscosity of 35 PS, 17 parts by weight of 1,6-hexanediol diglycidyl ether, 8 parts by weight of an acrylic oligomer, 2 parts by weight of finely powdered silica (RY-200S produced by Nippon Aerosil Co., Ltd.) and one part by weight of color toner (ECB-401 produced by Dai-Nippon Shikizai Kogyo KK) were mixed by a mixer and left in a 0° C. room for more than 24 hours. Meanwhile (ii) 60 parts by weight of a metaxylenediamine-based Mannich curing agent was left in a 0° C. room for more than 24 hours. The (i) and (ii) were mixed well just before use. The ratio of the number of epoxy groups and acrylate groups to the number of active hydrogens in the obtained impregnating resin 2 was 1.0.

(12) Impregnating Resin 3

(i) 73 parts by weight of a bisphenol F epoxy resin having a 25° C. viscosity of 35 PS, 27 parts by weight of 1,6-hexanediol diglycidyl ether, 2 parts by weight of finely powdered silica (RY-200S produced by Nippon Aerosil Co., Ltd.) and one part by weight of color toner (ECB-401 produced by Dai-Nippon Shikizai Kogyo KK), and (ii) 52 parts by weight of a metaxylenediamine-based Mannich curing agent and 3 parts by weight of polyoxypropylenediamine, were mixed severally by a mixer and left in a 0° C. room for more than 24 hours. The (i) and (ii) were mixed well just before use. The ratio of the number of epoxy groups to the number of active hydrogens in the obtained impregnating resin 3 was 1.0.

(13) Impregnating Resin 4

(i) 100 parts by weight of bisphenol A epoxy resin composition containing reactive diluent (a commercial impregnating resin for used in winter season) (XL-700WR produced by Mitsubishi Chemical Corporation), and (ii) 50 parts by weight of a curing agent comprising mainly modified alicyclic polyamine (XL-700WH produced by Mitsubishi Chemical Corporation) were left separately in a 0° C. room for more than 24 hours and mixed well just before use.

(14) Impregnating Resin 5

100 parts by weight of bisphenol A vinyl ester resin (Ripoxy R-804 produced by Showa Highpolymer Co., Ltd.), 1 part by weight of t-butyl peroxybenzoate and 0.5 part by weight of cumene hydroperoxide, 0.85 part by weight of cobalt naphthenate and 0.6 part by weight of acetoethyl acetate were left in a −5° C. room for more than 24 hours and mixed at the same temperature when used.

(15) Fiber Sheet 1

A carbon fiber sheet (Replark 30 Type mfd. by Mitsubishi Chemical Corporation; 300 g/m$^2$) was used after left in a 0° C. room for more than 24 hours.

(16) Fiber Sheet 2

A carbon fiber sheet (Replark 30 Type mfd. by Mitsubishi Chemical Corporation; basis weight 300 g/m$^2$) was used after having been left in a −5° C. room for more than 24 hours.

Testing Methods (1) Bond Strength Testing Method

The test was conducted according to the bond testing method of the Building Research Institute of the Ministry of Construction. Test piece was made by applying an adhesive to the central part of a 7 cm×7 cm bond testing piece and bonding thereto an attachment (4 cm×4 cm in section) for tensile test. This test piece was set in a BRI bond tester (mfd. by Yamamoto Kojyuki Co., Ltd.) and pulled in the direction normal to the surface in a 23° C. environment, and the maximum tensile load (kgf) at break was read while observing the condition of break. The read value was divided by the area (16 cm$^2$) and the quotient was expressed as bond strength (kgf/cm$^2$). The above test was conducted on 4 test pieces for each specimen and the mean value was determined.

(2) Peel Strength Testing Method

A peel strength test piece was set horizontally in a Shimadzu Autograph DSS-5000 in a 23° C. measuring environment, and the carbon fiber sheet jutting out from the bonded portion of the test piece was clutched and pulled at a head speed of 20 mm/min in the direction normal to the test piece surface. The maximum tensile load (kgf) in this situation was read while observing the condition of peel. The read value was expressed as peel strength (kgf/5 cm). The above test was conducted on 4 bonded portions for each specimen and the mean value was determined.

(3) CFRP Tensile Strength

A 250 mm×12.5 mm test piece for measuring CFRP tensile strength was set in a Shimadzu Autograh DSS-5000, with the chuck interval adjusted to be 100 mm, in a 23° C. measuring environment and pulled at a speed of 2 mm/min, and the maximum tensile load (kgf) in this run was read. The read value was divided by the area (mm$^2$) held by carbon fibers in the section of the test piece, and the quotient was expressed as CFRP tensile strength (kgf/mm$^2$). The above test was conducted on 7 test pieces for each specimen and the mean value was determined.

(4) Viscosity (PS)

The resin and curing agent to be tested were mixed well and the viscosity of the mixture was measured immediately in unit of PS (poise) under a 0° C. condition by using a Brook field type viscometer.

(5) Set-To-Touch Curing Time Testing Method

The resin composition and curing agent composition to be tested or the resin, polymerization initiator and accelerator to be tested were mixed well and the mixture was immediately coated on a polyethylene terephthalate film to a thickness of 0.5 mm and left under a −5° C. or 0° C. condition. The time required till the coating became set (tack-free) to touch was measured.

(6) Pot Life Testing Method

The resin composition containing bisphenol F epoxy resin and curing agent composition to be tested or the resin, polymerization initiator and accelerator to be tested were mixed well, and 100 g (150 g in the case of putty) of the mixture was immediately put into a paper cup. The paper cup was set in a thermocouple recorder placed in a −5° C. or 0° C. environment, and its temperature was measured successively. The time (min) taken from mixing till reaching the peak temperature was read and multiplied by 0.7, and the product was expressed as pot life (min). In case of resin composition containing vinyl ester resin, the resin, polymerization initiator and accelerator were mixed well and 100 g (150 g in case of putty) of the mixture was immediately put into a paper cup. In a −5° C. environment, gelation thereof was observed visually and the time (min) taken till starting the gelation was expressed as pot life (min).

(7) Coating Properties Testing Method

In the case of primer, 150 g/m$^2$ of primer was coated on a concrete slab placed in a −5° C. or 0° C. environment, and in the case of putty, 850 g/m$^2$ of putty was coated on the primer layer placed in a −5° C. or 0° C. environment, and their coating properties were evaluated according to the following criterion.

○: Uniform (coating uniformly)
Δ: Slightly non-uniform (coating slightly non-uniformly)
×: Non-uniform (coating non-uniformly)

(8) Resin Impregnation Testing Method

The impregnating resin to be tested was coated to a coating weight of 400 g/m$^2$ on a concrete slab placed in a −5° C. or 0° C. environment and the carbon fiber sheet 1 or 2 was bonded thereto and pressed down by a roller to have the resin impregnated in the sheet. 20 minutes thereafter, the condition of resin impregnation (penetration) was evaluated according to the following criterion.

○: Good impregnation (good seepage of undercoat resin)
Δ: Slightly bad impregnation (slightly poor seepage of undercoat resin)
×: Bad impregnation (poor seepage of undercoat resin)

(9) Thixotropy Testing Method

The impregnating resin to be tested was coated to a coating weight of 400 g/m$^2$ on the concrete wall surface having a primer layer and a putty layer formed thereon, and the carbon fiber sheet 1 or 2 was bonded thereto and pressed down by a roller to remove air bubbles or voids on the rear side of the fiber sheet 1 or 2. After 20-minute standing, the same impregnating resin was coated on the fiber sheet 1 or 2 to a coating weight of 300 g/m$^2$, and thixotropy was evaluated according to the following criterion.

○: No sags of resin
Δ: Slight sags of resin
×: Many sags of resin

Example 1

(A) The said primer 1 was coated to a coating weight of 150 g/m$^2$ on the surface of the said concrete slab (30 cm×30 cm) left in a 0° C. room, and cured in a 0° C. environment for 6 hours. Then the said putty 1 was coated thereon to a coating weight of 800 g/m$^2$ in the same 0° C. environment and cured in the same environment for 16 hours. Thereafter, the impregnating resin 1 was applied thereon to a coating weight of 400 g/m$^2$ and the fiber sheet 1 cut to a size of 30 cm×30 cm was attached on the coated surface of the concrete slab and pressed down by a roller to remove air bubbles on the rear side of the fiber sheet 1. After 20-minute standing, the same impregnating resin was applied on the surface to a coating weight of 300 g/m$^2$ and cured in a 0° C. environment for 12 days, followed by cladding with the fiber sheet. Four bond strength testing pieces (70 mm×70 mm) were made from the resultantly obtained fiber sheet-clad concrete slab and subjected to a bond test according to the above-described bond strength testing method. The results are shown in Table 1.

(B) A peel testing piece comprising a concrete slab clad with four fiber sheets 1 was made in the same way as described in (A) above except that the four fiber sheets were attached on the concrete slab by arranging them in such a manner that for facilitating the peel strength test and measurement, each fiber sheet 1 cut to a length (in the fiber direction) of 400 mm and a width of 50 mm would protrude 100 mm so that an end of the sheet in its longitudinal direction would become the starting point of peel, and that a space of 20 mm would be produced on both sides of each fiber sheet for conducting the test a plural number of times. This testing piece was subjected to the above-described peel strength test and the result was shown in Table 1.

(C) The fiber sheet 1 was cut to a size of 30 cm×30 cm and the said impregnating resin was applied on the cut sheet to a coating weight of 400 g/m² from one side of the sheet and 300 g/m² from the other side in a 0° C. environment, allowing the resin to be impregnated in the sheet, and cured in the same environment for 12 days. Thereafter, the fiber sheet was cut in the fiber direction to prepare seven 12.5 mm wide test pieces for measurement of CFRP tensile strength and these test pieces were subjected to the above-described CFRP tensile strength test. The result is shown in Table 1.

Example 2

In (A), (B) and (C) of Example 1, there were used the primer 1, the putty 1 and the impregnating resin 3, respectively, to make the bond strength testing pieces, peel strength testing pieces and CFRP testing pieces in otherwise the same way as in Example 1, and they were subjected to the above-described bond strength test, peel strength test and CFRP tensile strength test. The results are show in Table 1.

Example 3

In (A), (B) and (C) of Example 1, there were used the primer 2, the putty 2 and the impregnating resin 1, respectively, to make the bond strength testing pieces, peel strength testing pieces and CFRP testing pieces in otherwise the same way as in Example 1, and they were subjected to the above-described bond strength test, peel strength test and CFRP tensile strength test. The results are shown in Table 1.

Example 4

In (A), (B) and (C) of Example 1, there were used the primer 2, the putty 2 and the impregnating resin 2, respectively, to make the bond strength testing pieces, peel strength testing pieces and CFRP tensile strength testing pieces in otherwise the same way as in Example 1, and they were subjected to the above-described bond strength test, peel strength test and CFRP tensile strength test. The results are shown in Table 1.

Example 5

In (A), (B) and (C) of Example 1, there were used the primer 2, the putty 2 and the impregnating resin 3, respectively, to make the bond strength testing pieces, peel strength testing pieces and CFRP tensile strength testing pieces in otherwise the same way as in Example 1, and they were subjected to the above-described bond strength test, peel strength test and CFRP tensile strength test. The results are shown in Table 1.

Comparative Example 1

In (A), (B) and (C) of Example 1, there were used the primer 3, the putty 3 and the impregnating resin 4, respectively, to make the bond strength testing pieces, peel strength testing pieces and CFRP tensile strength testing pieces in otherwise the same way as in Example 1, and they were subjected to the above-described bond strength test, peel strength test and CFRP tensile strength test. The results are shown in Table 1.

Supplementary Test

The set-to-touch curing time, pot life and coating properties were determined for each of the said primers and putties, while the set-to-touch curing time, pot life, impregnating properties (penetrability) and thixotropic properties were determined for each of the said impregnating resins. The results are shown in Table 2.

TABLE 1

|  | Example 1 | Example 2 | Example 3 |
|---|---|---|---|
| <Coating amount (g/m²)> | | | |
| Primer | 150 | 150 | 150 |
| Putty | 800 | 800 | 800 |
| Impregnating resin | | | |
| Undercoat | 400 | 400 | 400 |
| Topcoat | 300 | 300 | 300 |
| Bond strength (kgf/cm²) | 30 | 30 | 30 |
| Rupture cross-section | C-break | C-break | C-break |
| Peel strength (kgf/5 cm) | 20 | 20 | 20 |
| Peel area | C-break | C-break | C-break |
| CFRP tensile strength (Kgf/mm²) | 380 | 400 | 380 |

|  | Example 4 | Example 5 | Comp. Example 1 |
|---|---|---|---|
| <Coating amount (g/m²)> | | | |
| Primer | 150 | 150 | 150 |
| Putty | 800 | 800 | 800 |
| Impregnating resin | | | |
| Undercoat | 400 | 400 | 400 |
| Topcoat | 300 | 300 | 300 |
| Bond strength (kgf/cm²) | 30 | 30 | 10 |
| Rupture cross-section | C-break | C-break | P/G |
| Peel strength (kgf/5 cm) | 20 | 20 | 2 |
| Peel area | C-break | C-break | P/G |
| CFRP tensile strength (Kgf/mm²) | 370 | 400 | 230 |

In Table 1, "C-break" indicates that the concrete layer was broken, and "P/G" indicates that peeling took place between the primer layer and the carbon fiber sheet layer.

TABLE 2

|  | Viscosity (PS) | Set-to-touch curing time (hr) | Pot life (min) |
|---|---|---|---|
| Primer 1 | 50 | 12 | 85 |
| Primer 2 | 75 | 8 | 50 |
| Primer 3 | 100 | 40 | >300 |
| Putty 1 | 720 | 10 | 85 |
| Putty 2 | 750 | 7 | 50 |
| Putty 3 | putty-like | 40 | >300 |
| Impregnating resin 1 | 100 | 12 | 80 |
| Impregnating | 130 | 8 | 50 |

TABLE 2-continued

|  | Viscosity (PS) | Set-to-touch curing time (hr) | Pot life (min) |
|---|---|---|---|
| resin 2 | | | |
| Impregnating resin 3 | 95 | 13 | 90 |
| Impregnating resin 4 | 150 | 40 | >300 |

|  | Coating properties | Impregnating properties | Thixotropic properties |
|---|---|---|---|
| Primer 1 | ○ | — | — |
| Primer 2 | ○ | — | — |
| Primer 3 | Δ | — | — |
| Putty 1 | ○ | — | — |
| Putty 2 | ○ | — | — |
| Putty 3 | × | — | — |
| Impregnating resin 1 | — | ○ | ○ |
| Impregnating resin 2 | — | ○ | ○ |
| Impregnating resin 3 | — | ○ | ○ |
| Impregnating resin 4 | — | Δ | ○ |

In Table 2, ">300" indicates that the pot life is longer than 300 minutes.

As is seen from the results shown in Table 1, in the reinforcing method using the primer, putty and impregnating resin of the Comparative Example, bond strength of the fiber sheet to the concrete surface is notably low and peeling takes place between the primer layer and the fiber sheet layer. In contrast, in the reinforcing method using the primers, putties and impregnating resins according to the present invention, since strong bond is provided even if the reinforcing work is conducted in a low-temperature environment, no peeling takes place between the primer layer and the fiber sheet. When peeling occurs, it is due to break in the inside of the concrete layer.

Example 6

(A) The said primer 4 was coated to a coating weight of 150 g/m² on the surface of the said concrete slab (30 cm×30 cm) kept in a −5° C. room, and was cured in a −5° C. environment for 3 hours. Then the impregnating resin 5 was coated thereonto a coating weight of 400 g/m² in the same −5° C. environment, followed by cladding of the whole surface of the thus coated concrete slab with the carbon fiber sheet 2, and the sheet was pressed by a roller to eliminate the air bubbles or voids in the underside of the said sheet 2. After 15-minute standing, the same impregnating resin 5 was coated on the front side of the sheet to a cutting weight of 300 g/m² and cured as such in the −5° C. environment for 12 days. The thus worked concrete slab was cut to a size of 70 mm×70 mm to make the bond strength testing pieces, and these testing pieces were subjected to the above-described bond strength test. The main testing conditions are shown in Table 3 and the results are shown in Table 4.

(B) The peel testing pieces were made in the same way as described in (A) above except that the four carbon fiber sheets were arranged on the concrete slab in such a manner that for facilitating the peel strength test and measurement, each fiber sheet 3 having a length of 400 mm (in the fiber direction) and a width of 50 mm would protrude 100 mm so that an end of the sheet in its longitudinal direction would become the starting point of peel, and that a space of 20 mm would be produced on both sides of each fiber sheet for conducting the test a plural number of times. This testing piece was subjected to the above-described peel strength test. The main testing conditions are shown in Table 3 and the results are shown in Table 4.

Example 7

By following the procedure of Example 6, a second carbon fiber sheet layer was formed and cured on the first carbon fiber sheet layer on the concrete slab described in (A) of Example 6. The thus worked concrete slab was cut to a size of 70 mm×70 mm to make the bond strength testing pieces and the latter were subjected to the above-described bond strength test. The main testing conditions are shown in Table 3 and the results are shown in Table 4.

Example 8

The said concrete slab (30cm×30 cm) kept in 5° C. water for more than 24 hours was placed in a vat with the side of the slab to be treated facing upward, and water was poured into the vat to a level 5 mm beneath the top surface of the concrete slab. With the test piece being thus kept in a wet state, water droplets on the top surface were wiped away with a web and the said primer 4 was coated thereon to a coating weight of 150 g/m2 before the concrete surface dried, and cured in a 5° C. environment for 15 hours while maintaining the said wet state.

Then the impregnating resin 5 was coated thereon to a coating weight of 400 g/m² in a 5° C. environment and the whole surface was clad with the carbon fiber sheet 2, the latter being pressed by a roller to remove the air bubbles on the underside of the sheet 2. After 15-minute standing, the impregnating resin was coated to a coating weight of 300 g/m² and cured as such in a 5° C. environment for 2 days, followed by additional curing in a 23° C. environment for 2 days. During curing, the sheet was kept in a wet state as in the previous cases. The thus worked concrete slab was cut to a size of 70 mm×70 mm to make the bond strength testing pieces and subjected to the above-described bond test. The main testing conditions are shown in Table 3 and the results are shown in Table 4.

Example 9

(A) The bond strength testing pieces were made by following the procedure of Example 6(A) except that after coating and curing the primer 4, the putty 4 was coated thereon to a coating weight of 800 g/m² before forming the carbon fiber sheet layer and cured in a −5° C. environment for 2 hours, and the testing pieces were subjected to the above-described bond test. The main testing conditions are shown in Table 3 and the results are shown in Table 4.

(B) The peel strength testing pieces were made in the same way as described in (A) above except that the four carbon sheets were arranged on the concrete slab in such a manner that, for facilitating the peel strength test and measurement, each carbon fiber sheet 2 having a length of 400 mm in the fiber direction and a width of 50 mm would protrude 100 mm so that an end of the sheet in its longitudinal direction would become the starting point of peel, and that a space of 20 mm would be produced on both sides of each fiber sheet for conducting the test a plural number of times. These testing pieces were subjected to the above-described peel strength test. The main testing conditions are shown in Table 3 and the results are shown in Table 4.

TABLE 3

|  | Example 6 | Example 7 | Example 8 | Example 9 |
|---|---|---|---|---|
| <Coating amount (g/m$^2$)> | | | | |
| Primer 4 | 150 | 150 | 150 | 150 |
| Putty 4 | — | — | — | 800 |
| Impregnating resin | | | | |
| 1st layer (undercoat) Impregnating resin 5 | 400 | 400 | 400 | 400 |
| 1st layer (topcoat) impregnating resin 5 | 300 | 300 | 300 | 300 |
| 2nd layer (undercoat) Impregnating resin 5 | — | 400 | — | — |
| 2nd layer (topcoat) Impregnating resin 5 | — | 300 | — | — |

TABLE 4

|  | Example 6 | Example 7 | Example 8 | Example 9 |
|---|---|---|---|---|
| <Low-temperature bond properties> | | | | |
| Bond strength (kgf/cm$^2$) | 24 | 20 | 24 | 33 |
| Rupture cross-section | C-break | C-break | C-break | C-break |
| Peel strength (kgf/5 cm) | 3 | — | — | 3 |
| Peel area | C-break | — | — | C-break |

In Table 4, "C-break" indicates that the concrete layer was broken, and "P/G" indicates that peeling took place between the primer layer and the carbon fiber sheet layer.

As is seen from the results shown in Tables 3 and 4, according to the reinforcing method of this invention using the primer 4, the bonding force between the concrete surface and the carbon fiber sheet is strong even if the reinforcing work is conducted in a low-temperature or humid environment, and no peel takes place between the primer layer and the fiber sheet. The test results show that rupture occurs in the inside of the concrete layer.

The handling qualities of the primer 4, putty 4 and impregnating resin 5 used in Examples 6 to 9 were evaluated as described in (1) to (3) below. The results are shown in Table 5.

(1) The set-to-touch curing time, pot life and coating properties of the primer 4 were determined by the above-described set-to-touch curing time testing method, pot life testing method and coating properties testing method. (2) The set-to-touch curing time, pot life and coating properties of the putty 4 were determined by the above-described set-to-touch curing time testing method, pot life time testing method and coating properties testing method. (3) The set-to-touch curing time, pot life, impregnating properties and thixotropic properties of the impregnating resin 5 were determined by the above-described set-to-touch curing time testing method, pot life testing method, impregnating properties testing method and thixotropic properties testing method.

TABLE 5

| Type of resin | Primer 4 | Putty 4 | Impregnating resin 5 |
|---|---|---|---|
| Set-to-touch curing time (hr) | 3.0 | 1.7 | 2.5 |
| Pot life (min) | 40 | 45 | 42 |
| Coating properties | ◯ | ◯ | — |
| Impregnating properties | — | — | ◯ |
| Thixotropic properties | — | — | ◯ |

The practical effect of the impregnating resin 5 used in Examples 6 to 9 was determined in the following way. The impregnating resin 5 was coated on the back side of the carbon fiber sheet 2 to a coating weight of 0.4 kg/m$^2$ while the same impregnating resin was also coated on the front side of the sheet to a coating weight of 0.3 kg/m$^2$, allowing the resin to impregnate in the sheet, and the resin was cured in a −5° C. environment for 12 days. From this sheet, there were made 5 testing pieces having a length of 250 mm in the longitudinal direction and a width of 12.5 mm, and each sheet was set in a tensile testing machine and its breaking load when pulled at a speed of 2 mm/min was measured. The obtained value of breaking load was divided by the sectional area of the carbon fiber sheet 2 to calculate the strength value. The average of the 5 strength values determined was expressed as tensile strength. The thus determined tensile strength of the sheet was 391 kgf/mm$^2$.

What is claimed is:

1. A method for reinforcing a structure comprising the steps of
   forming a primer layer on the surface of a structure to be reinforced;
   applying an impregnating resin and a fiber sheet on the structure bearing the primer layer,
   allowing the resin to penetrate into spaces in the fiber sheets, and
   curing the resin,
   wherein said primer and impregnating resin comprise a resin composition which can cure at a temperature at or below 0° C.

2. The reinforcing method according to claim 1, wherein the resin composition which can be cured at a temperature at or below 0° C., is a mixture comprising (1) a resin composition having a number of functional groups, containing epoxy resin(s) and divalent alcoholic glycidyl ether, and (2) a curing agent composition having a number of active hydrogens, containing a Mannich curing agent.

3. The reinforcing method according to claim 2, wherein the resin composition which can be cured at a temperature at or below 0° C., is a mixture comprising:
   (1) a resin composition comprising 60 to 85 wt % of an epoxy resin having a viscosity of not more than 150 poise as measured at 25° C., 15 to 40 wt % of divalent diglycidyl ether, 0 to 15 wt % of an acrylic oligomer and 0 to 5 wt % of a thixotropic agent; and
   (2) the curing agent composition comprising 60 to 100 wt % of a Mannich curing agent and 0 to 40 wt % of an aliphatic polyether diamine.

4. The reinforcing method according to claim 2, wherein the ratio of the number of the functional groups in the resin composition to the number of active hydrogens in the curing agent composition is adjusted to fall in the range from 1:0.85 to 1:1.2.

5. The reinforcing method according to claim 2, wherein:
(1) the resin composition comprises a bisphenol epoxy resin of 70 to 75 wt % having a viscosity of not more than 40 poise at 25° C., 1,6-hexanediol diglycidyl ether of 25 to 30 wt % and thixotropic agent of 0 to 5 wt %; and
(2) the curing agent composition comprises a Mannich curing agent of 60 to 100 wt % and an aliphatic polyether diamine of 40 to 0 wt %.

6. A method for reinforcing a structure comprising the steps of
forming a primer layer on the surface of a structure to be reinforced;
applying an impregnating resin and a fiber sheet on the structure bearing the primer layer;
allowing the resin to penetrate into spaces in the fiber sheets; and
curing the resin at a temperature at or below 5° C.,
wherein the primer and impregnating resin comprise a resin composition which can cure at a temperature at or below 5° C.

7. The reinforcing method according to claim 2, wherein the Mannich curing agent comprises mainly metaxylene diamine.

8. The reinforcing method according to claim 6, wherein the resin composition which can be cured at a temperature at or below 5° C., is a mixture comprising (1) a resin composition containing epoxy resin(s) and divalent alcoholic glycidyl ether, and (2) a curing agent composition containing a Mannich curing agent.

9. The reinforcing method according to claim 1, wherein the resin composition contains vinyl ester resin.

10. The reinforcing method according to claim 1, wherein the resin composition contains vinyl ester resin, reactive diluent, polymerization initiator and curing accelerator.

11. The reinforcing method according to claim 10, wherein the resin composition comprises the vinyl ester resin of 30 to 80 wt %, the reactive diluent of 20 to 70 wt %, 0.1 to 8 parts by weight of the polymerization initiator based on 100 parts by weight of the vinyl ester resin and 0.1 to 5 parts by weight of the curing accelerator based on 100 parts by weight of the vinyl ester resin.

12. The reinforcing method according to claim 9, wherein the vinyl ester resin is a bisphenol A vinyl ester resin.

13. The reinforcing method according to claim 10, wherein the polymerization initiator is ketone peroxide, hydroperoxide, peroxyester or diacylperoxide.

14. The reinforcing method according to claim 10, wherein the curing accelerator is metallic soap or amine.

15. The reinforcing method according to claim 1, further comprising applying putty over the primer layer prior to applying the impregnating resin and fiber sheet, the putty comprising a resin composition which can cure at a temperature at or below 5° C.

16. The reinforcing method according to claim 1, wherein the fiber sheet has a fiber basis weight of 100 to 400 g/m2.

17. The reinforcing method according to claim 1, wherein the structure to be reinforced is a concrete structure.

18. The reinforcing method according to claim 1, wherein the fiber sheet is a carbon fiber sheet, aramide fiber sheet or glass fiber sheet.

19. The reinforcing method according to claim 1, wherein the fiber sheet is a carbon fiber sheet.

20. The reinforcing method according to claim 1, wherein the reinforcing method is conducted at a temperature of not more than 5° C.

21. The reinforcing method according to claim 15, wherein a mixture comprising 100 parts by weight of the resin composition which can be cured at a temperature at or below 5° C., and 50 to 150 parts by weight of a filler, is used as the putty.

22. The reinforcing method according to claim 1, wherein the impregnating resin and fiber sheet are applied by applying a layer of impregnating resin, and placing a fiber sheet on the layer of impregnating resin.

23. The reinforcing method according to claim 22, further comprising applying a layer of impregnating resin over the fiber sheet before curing the resin.

24. The reinforcing method according to claim 1, wherein the impregnating resin and fiber sheet are applied by placing a fiber sheet on the structure having the primer layer, and applying a layer of impregnating resin over the fiber sheet.

25. The reinforcing method according to claim 8, wherein
(1) the resin composition comprises a bisphenol epoxy resin of 70 to 75 wt % having a viscosity of not more than 40 poise at 25° C., 1,6-hexanediol diglycidyl ether of 15 to 20 wt %, acrylic oligomer of 5 to 10 wt % and thixotropic agent of 0 to 5 wt %, and
(2) the curing agent composition comprises a Mannich curing agent of 60 to 100 wt % and an aliphatic polyether diamine of 40 to 0 wt %.

26. A method for reinforcing a structure in accordance with claim 6,
wherein the primer and impregnating resin comprise a resin composition which can cure at a temperature at or below 0° C.

27. The reinforcing method according to claim 6, further comprising applying putty over the primer layer prior to applying the impregnating resin and fiber sheet, the putty comprising a resin composition which can cure at a temperature at or below 0° C.

28. The reinforcing method according to claim 6, wherein the impregnating resin and fiber sheet are applied by applying a layer of impregnating resin, and placing a fiber sheet on the layer of impregnating resin.

29. The reinforcing method according to claim 28, further comprising applying a layer of impregnating resin over the fiber sheet before curing the resin.

30. The reinforcing method according to claim 6, wherein the impregnating resin and fiber sheet are applied by placing a fiber sheet on the structure having the primer layer, and applying a layer of impregnating resin over the fiber sheet.

31. The reinforcing method according to claim 25, wherein the thixotropic agent is a powdered silica.

* * * * *

UNITED STATES PATENT AND TRADEMARK OFFICE
CERTIFICATE OF CORRECTION

PATENT NO. : 6,017,588
DATED : Jan. 25, 2000
INVENTOR(S) : Watanabe, et al.

It is certified that error appears in the above-identified patent and that said Letters Patent is hereby corrected as shown below:

On the cover page, after "[73] Assignee: Mitsubishi Chemical Corporation, Tokyo, Japan"

please insert -- Showa Highpolymer Co., Ltd., Tokyo, Japan--

Signed and Sealed this

First Day of August, 2000

Attest:

Q. TODD DICKINSON

*Attesting Officer*     *Director of Patents and Trademarks*